Figure 5:
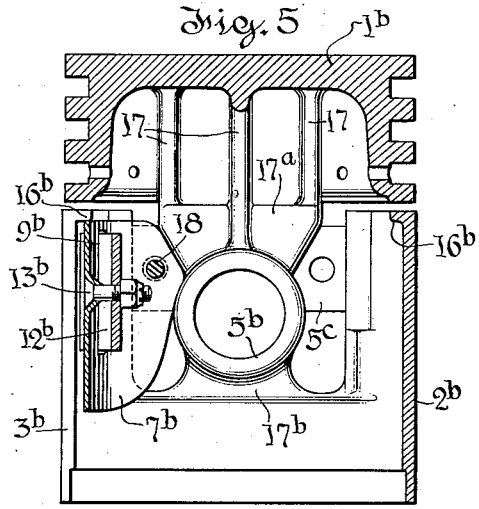

Oct. 22, 1935.  A. W. MORTON  2,018,412
EXPANDER FOR PISTONS
Filed June 10, 1933  2 Sheets-Sheet 1
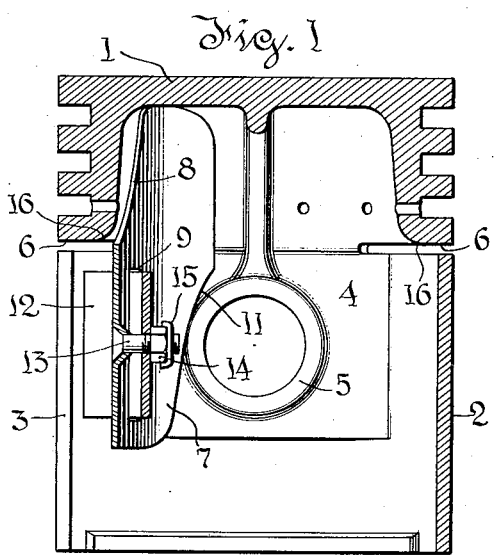
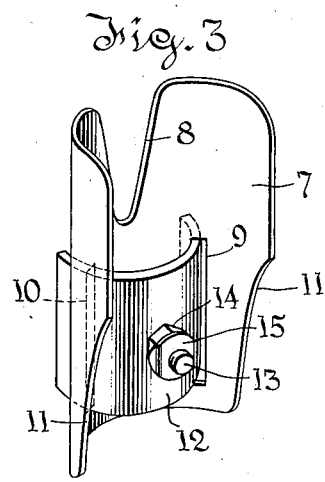
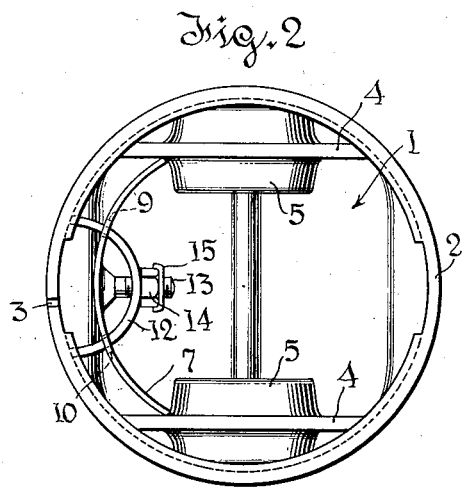
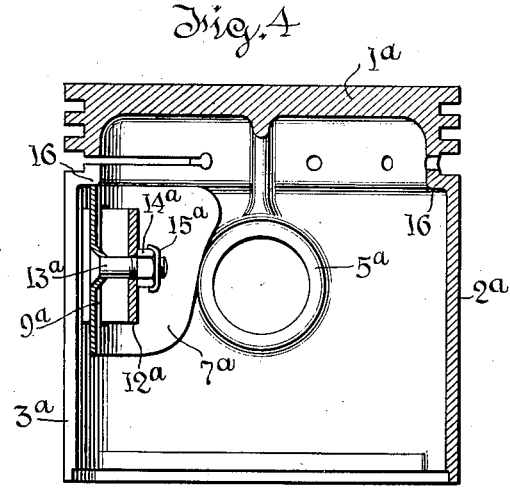
Inventor
Allen W. Morton Oct. 22, 1935.  A. W. MORTON  2,018,412

EXPANDER FOR PISTONS

Filed June 10, 1933  2 Sheets-Sheet 2

Inventor
Allen W. Morton
By Thorpe and Sons
Attorneys

Patented Oct. 22, 1935

2,018,412

UNITED STATES PATENT OFFICE

2,018,412

EXPANDER FOR PISTONS

Allen W. Morton, Baltimore, Md., assignor, by mesne assignments, to The Bartlett Hayward Company, Baltimore, Md., a corporation of Maryland Application June 10, 1933, Serial No. 675,270

14 Claims. (Cl. 309—12)

This invention pertains to expanders for pistons of the split or partially split skirt type, now generally employed in explosive engines.

The main object of the invention is to provide an expander having few parts,—one which may be readily positioned and adjusted, and, as it is adjusted to expand the piston, to lock itself in place within the piston. Furthermore, the construction of the expander is such that the piston skirt still remains flexible and will conform to the cylinder after the expander is in position and the piston expanded to the necessary and desired degree.

A further object of the invention is to produce an expander which will expand the piston evenly throughout the length of the split therein, thereby precluding inward movement except to a slight extent to conform to the cylinder wall.

A still further object resides in producing a structure which in expanding the piston, likewise brings the crank pin bosses into alignment after collapse of the piston skirt. The expander is such that it may be readily inserted and adjusted in a piston, and this without the necessity of removing the piston from the cylinder.

Various forms of commercial pistons are illustrated in the annexed drawings with the expander of my invention applied thereto, this to demonstrate its general applicability.

Figure 7:
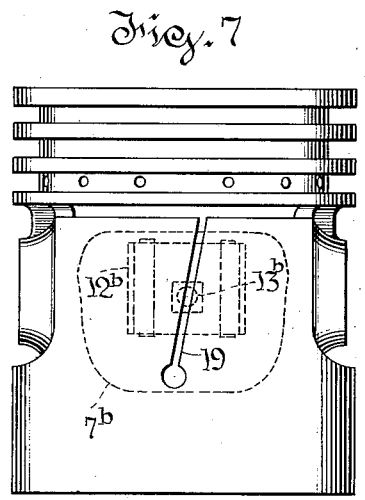
Figure 6:
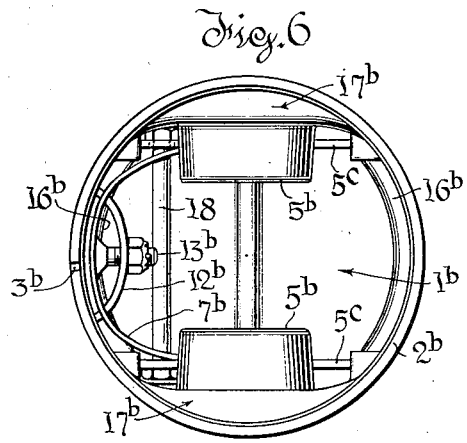
Figure 10:
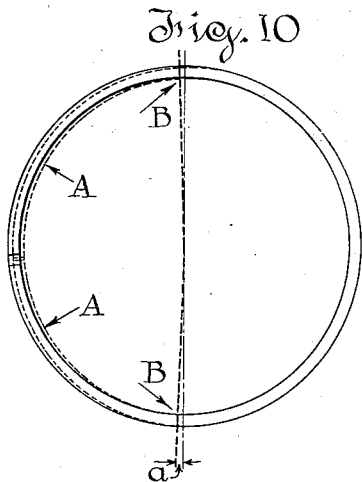
Figure 9:
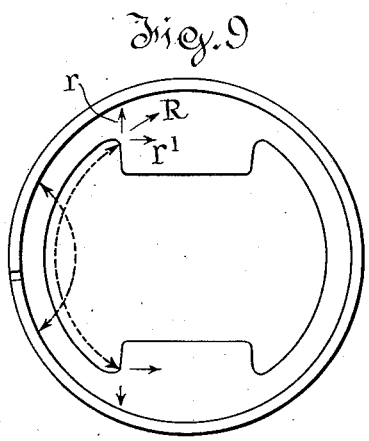
Figure 8:
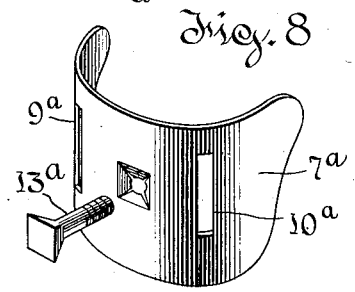

In the drawings:

Fig. 1 is a vertical sectional view of a piston having a split skirt and an expander of such dimensions that the upper edge thereof contacts the under face of the head;

Fig. 2, a bottom plan view looking up into the piston;

Fig. 3, a perspective view of the expander employed in Figs. 1 and 2;

Fig. 4, a vertical sectional view of a slightly different form of piston, with an expander of my invention somewhat shorter than that of Figs. 1, 2 and 3, with the upper end bearing directly against an inwardly projecting shoulder formed at the junction of the head and skirt;

Fig. 5, a vertical sectional view of a piston embodying invar struts, only one being shown;

Fig. 6, a bottom plan view thereof;

Fig. 7, a side elevation of what is commonly known as a T-slot piston, with the expander shown in dotted lines;

Fig. 8, a perspective view of that element of the expander hereinafter denominated the expander element or expander spring, and showing how the bolt head may be seated therein to prevent the bolt from turning;

Fig. 9, a bottom plan view looking up toward the piston head, with arrows indicating diagrammatically the effect of the proper expansion on the skirt necessary to keep the piston in line or to bring it back in line after the skirt has collapsed; and Fig. 10, a diagrammatic view indicating by arrows the points at which pressure should be applied to the skirt and bosses to bring the parts back to proper position.

As will be seen upon reference to the drawings, the expander may vary in height (see more particularly Figs. 3 and 8) so that its upper end (or ends, Figs. 1 and 3) may bear directly against the under or inner surface of the piston head (Fig. 1), or against a shoulder formed at the junction of the skirt and head, as in Figs. 4 and 5.

Referring first to Figs. 1, 2 and 3, the reference character 1 designates the head of a piston provided with the usual ring-receiving grooves, and 2 the skirt which is split at 3. The skirt, as is usual in pistons of this type, is attached to the head by webs or columns 4 which carry the piston pin bosses 5, but is otherwise separated by the oppositely disposed openings 6.

The expander as shown in these figures, is designed so that the upper end thereof bears against the under face of the head 1 or in substantial alignment with the plane of the upper ring-receiving groove, the bosses adjacent the webs or columns 4, and against the inner face of the skirt to each side of the substantially vertically disposed slot 3. The member 7, which bears against the head and bosses, is formed from spring steel and is curved, as shown, upon a radius substantially equal to that of the piston. In the form being described, the upper portion of the member 7 is provided at its mid section with a cut-away portion 8, and the extreme upper edges to each side of said cut-away portion are rounded so that the member 7 has what may be looked upon as a point bearing.

Adjacent the lower portion of the member 7 there is formed a pair of vertically disposed slots 9 and 10, and the edges of the member 7 at the lower portion thereof are curved or cut away as at 11, upon each side of said member. Said curved sections, as will be seen upon reference to Figs. 1 and 2, bear directly against the bosses 5 at their juncture with the columns 4.

The element 7, as above stated, is preferably formed of spring steel and may be called a retaining spring. Extending through the slots 9 and 10 formed in the member 7 is a curved or arcuate shaped element 12, the ends whereof (see Figs. 1 and 2) bear against the inner face of the skirt to each side of the slit 3 therein. This element is likewise preferably formed of spring steel and may be made either of greater or less thickness than the retaining spring.

As will be seen upon reference to Fig. 1, the end of member 12 has a line bearing to each side of the slot or split 3. A bolt 13 has its head mounted in the retaining spring 7 and extends freely through an opening formed in the expander spring. A nut 14 and a lock washer 15, which latter may be brought into engagement with the nut when adjustment of the parts is effected, are mounted upon the outer end of the bolt. When it is desired to expand a piston which has collapsed, the nut is backed off the bolt and the parts moved inwardly to the position shown in Fig. 1, and the nut tightened up and locked in position by the lock washer when the necessary expansion of the piston has been effected. A castellated nut, as in Figs. 5 and 6, may be employed instead of a lock washer.

As will be seen more particularly upon reference to Fig. 1, the retaining spring is locked in place against the under face of the piston head and against the pin bosses 5. The expander spring 12 maintains the retaining spring directly against the bosses at the point of mergence or junction of the bosses and the columns 4. In addition to expanding the skirt of the piston, particularly at the upper portion of the skirt where collapse more frequently occurs, the retaining spring will, when the parts of the expander are placed under stress, exert pressure upon each of the bosses and tend to bring them into axial alignment.

As above noted, instead of making the member 7 of a length sufficient to take against the under face of the head 1, it may be made relatively short or of a height which when positioned within the piston will bear against the bosses and against the inwardly projecting shoulder 16 formed in the piston immediately below the ring-receiving grooves.

In Fig. 4 such a construction is shown as applied to a piston wherein the bosses are formed in the body or skirt of the piston proper and not in the columns as in Fig. 2. In this instance, the retaining and/or boss-engaging spring is denoted by 7ª, and inasmuch as the other portions of the retainer are identical, they are lettered the same as those in Figs. 1, 2 and 3 with the exponent "a" added thereto.

The retaining spring in this instance may be made of the form best shown in Fig. 8. Said figure is also illustrative of the manner in which the square head bolt which is employed may be held against turning with the nut when the nut is tightened. In other words, there is a tapered square socket formed in the member 7ª, and the head of the bolt fits therein. The socket may, of course, be of any form and the bolt head brazed or soldered therein.

In this instance, the retaining spring at its upper end bears against the inwardly projecting shoulder, formed as above noted. The expander has the same locking action between the bosses and the shoulder 16 as does the construction shown in Figs. 1 and 2. So, too, the expander member 12ª acts in a like manner. Upon tightening of the nut, the skirt will be expanded and the expander will become locked in place against any displacement.

In Figs. 5 and 6, the expander is shown in connection with a piston involving the use of invar struts 5ᶜ. The skirt 2ᵇ is split as in the other forms, and the bosses 5ᵇ are carried by columns 17 and webs 17ª and 17ᵇ, as is usual.

In pistons of this type, there is present an inwardly projecting shoulder 16ᵇ at the upper end of the split skirt. The upper end of the retaining spring 7ᵇ in this instance bears against the shoulder 16ᵇ and at the curved cut-away portion of the inner edges of the spring, a bearing is had against the bosses directly adjacent the junction of the invar struts therewith.

If so desired, a bolt as 18 may be passed through the usual openings found in the invar struts, and through openings formed in the retaining spring, said openings, as indicated in dotted lines in Figs. 5 and 6, being somewhat larger than the diameter of the bolt, thus allowing the member 7ᵇ to be moved towards straightened position throughout the major portion of its length. The placement of this bolt would, however, necessitate the removal of the piston from the cylinder. Its presence is not necessary to hold the expander in place.

In Fig. 7, a T-slot piston is shown and the expander is depicted in dotted lines. Here, again, the expander will spread the upper free sections of the skirt to both sides of the slot 19. Inasmuch as the lower portion of the piston is continuous and rarely collapses, for the reason among others that it rarely encounters a temperature sufficiently high to deform it, no expander at that point is essential.

When the skirt of a piston does collapse, it is forced inwardly and the slots become practically closed. As a rule, the axes of the piston pin bosses are thrown out of line and the piston pins often wedge in the bosses or else wear the opening in the bosses oversize, so that a slight noise soon develops, which is generally known as a "pin slap" or a "click".

In Fig. 9, an ordinary piston is shown, looking up toward the head from the bottom. The arrows indicate diagrammatically the two spring members of the expander and the effect of the proper expansion on the skirt which is necessary to keep the piston in line or to bring it back in line after the skirt has collapsed. The resultant force, indicated by arrow R, resolves itself, as indicated by arrows r and r', into side and back pressure.

Fig. 10 is a diagrammatic view illustrating the application of the proper pressures at the points at which they should be applied by the expander, to bring the piston back to normal size.

The collapsed piston is indicated in dotted lines, and the expanded piston in full lines. The angle "a" shows the effect of skirt collapse on the axes of the piston pin bosses. Consequently, a skirt expander should produce pressure at the points B, and also a resulting pressure at the points designated by A. As a result of such pressure, the slot in the skirt of the piston would open and the periphery of the piston would increase and take the full-line position, as shown in said Fig. 10. At the same time, the pressure exerted at the points B on the piston pin bosses would tend to straighten out the axis of the piston-pin hole, and the piston would resume its normal shape.

By reason of the fact that the main elements of the expander are formed from spring material, the skirt is still flexible and will conform to the cylinder in the operation of the engine. In other words, the construction of the expander which has a spring action throughout, is such that the piston may give slightly to bring about the proper fit between it and the cylinder.

Also, the construction of the expander is such that a three-point contact is effected between the expander and the piston skirt to each side of the slot or slit therein. By reason of this fact, the expander will readily seat itself under all conditions.

In all of the forms, it is to be noted that the retaining member of the expander which bears against the bosses at the adjacent portion of the skirt or of the bosses and the adjacent portion of the invar strut, is above the axes of the bosses, or stated in another way, above the horizontal line extending at right angles to the longitudinal axis of the cylinder and passing through the center of the bosses.

Thus, the expander when it is locked in place between a fixed portion of the skirt or head, as the case may be, and the bosses, is precluded from any possibility of its dropping out.

What is claimed is:

1. In combination with a piston having a split skirt and oppositely disposed crank pin bosses, a spring expander located within the piston skirt bearing directly against the under face of the piston head in substantial alignment with the uppermost ring-receiving groove formed exteriorly of the piston, also against each boss above the axes and at that side thereof nearest the split and likewise bearing upon the inner face of the skirt to each side of the split; and means for placing the expander under greater or less stress.

2. An expander for pistons, comprising two curved sheets of spring metal, one of said sheets having openings therein and the other of said sheets having its ends passed through said openings; and means for drawing said sheets together.

3. In combination with a piston comprising a head, piston pin bosses and a skirt containing a slit therein, an expander for said piston as described in claim 2, wherein one of the sheets is substantially larger than the other and bears against the under side of the head and against the piston pin bosses above the center thereof, the other sheet being formed to bear against the inner side of the skirt of the piston on either side of the slit therein.

4. In combination with a piston comprising a head, piston pin bosses and a skirt containing a slit therein, an expander for said skirt consisting of two sheets of metal curvilinear in form with slits in one of said sheets and assembled with the concave surfaces opposite and the axes of curvature of the two sheets lying in the same plane and parallel to each other and the ends of one sheet passing through the slits in the other; and means connected with the two sheets for drawing the concave surfaces together and causing the ends of one sheet to bear against the upper portion of the piston pin bosses and the ends of the other sheet to bear against the skirt of the piston on either side of the slit therein.

5. In combination with a piston containing a head, oppositely disposed crank pin bosses, and a skirt slotted in one side thereof, an adjustable expander for said skirt fitting in the interior of said piston, comprising two oppositely disposed bow-shaped members having parallel axes and lying in the same plane, one of the bow-shaped members bearing against the upper part of the piston and against the crank pin bosses at points furthest removed from the axis of the piston and the other member bearing against the skirt on either side of the slot therein; and adjustable means for placing the bow-shaped members under tension.

6. As a new article of manufacture, an expander for split pistons, comprising two spring sheets, one sheet having openings therein through which the ends of the other sheet pass, said sheets being curved in opposite directions; and means for drawing the sheets toward each other adjacent the mid-length thereof.

7. As a new article of manufacture, an expander for split pistons as set forth in claim 6, wherein the ends of the member which project through the openings in the other member or sheet are adapted to contact the interior of the piston to each side of the split and the ends of the other member are so contoured as to bear upon the piston pin bosses above the center thereof and likewise a fixed portion of the piston.

8. As a new article of manufacture, an expander for split pistons, comprising a curved spring member adapted to bear against a fixed portion of the piston and the piston pin bosses above the axes thereof; a second curved spring member supported by the first member, said member at its ends bearing upon the piston skirt to each side of the split; and means acting to straighten said members.

9. In combination with a piston having a split skirt and invar struts; piston pin bosses associated with said struts; an outwardly curved spring member bearing at its ends against the point of junction of said struts and the bosses above the axes of the latter and at that side adjacent the split; and means for stressing said spring member to lessen the radius of curvature of the central portion thereof, and thereby exert pressure against the struts and bosses.

10. A structure as set forth in claim 9, wherein the stressing means comprises a reversely curved spring member, the ends whereof bear against the piston to each side of the split; and means for drawing the reversely curved members together.

11. In combination with a split piston having piston pin bosses extending inwardly of the same, an outwardly curved spring member bearing at its ends against the bosses and a remote fixed portion of the piston; a member supported thereby for expanding the piston; and means for drawing the outwardly curved member toward straightened position and thereby causing it to be held tightly between the bosses and the fixed portion aforesaid.

12. A structure as set forth in claim 11, wherein the means for straightening the curved member comprises means supported by said member for expanding the piston skirt; and means for placing said curved member and the skirt expanding member under stress.

13. In combination with a piston comprising a head having ring-receiving grooves formed in the upper circumferential portion thereof, piston pin bosses, and a skirt containing an axially extending slit; a spring type expander comprising two members adjustable with reference to each other and to the piston, one of said members bearing at its upper end against the under side of the piston head in substantial alignment with the uppermost ring-receiving groove and against those sides of the piston pin bosses adjacent the slit in the skirt, while the other member bears against the inner circumference of the skirt of the piston to either side of the slit therein.

14. In combination with a piston having a split skirt and invar struts; piston pin bosses associated with said struts; an outwardly curved spring member bearing at its ends against the point of junction of said struts and the bosses at that side adjacent the split in the skirt; and means for stressing said spring member to lessen the radius of curvature of the central portion thereof and thereby exert pressure against the struts.

ALLEN W. MORTON.